Nov. 12, 1963    D. W. GLADDEN    3,110,505
REINFORCING ARRANGEMENT FOR AUTOMOBILE FRONT WHEEL SUSPENSION
Filed Feb. 19, 1962
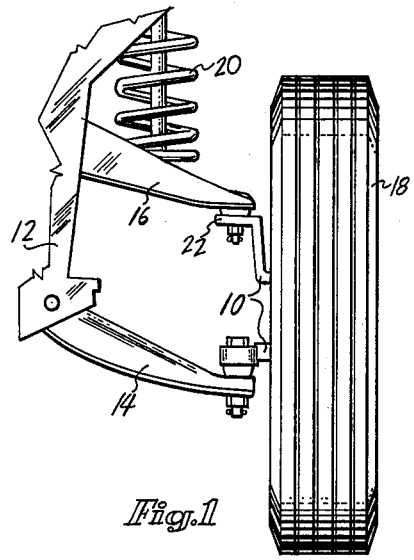
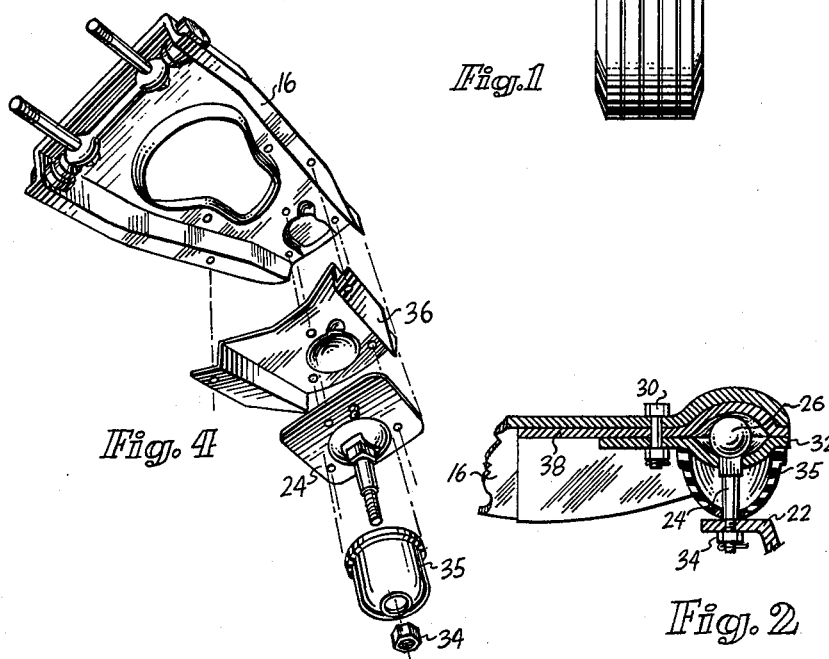
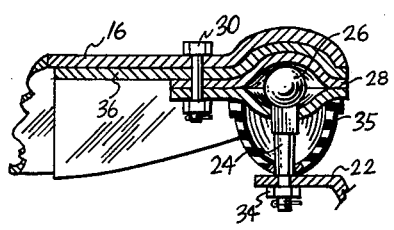
Donald W. Gladden
INVENTOR.
BY
Atty.

United States Patent Office 3,110,505
Patented Nov. 12, 1963

3,110,505
REINFORCING ARRANGEMENT FOR AUTO-
MOBILE FRONT WHEEL SUSPENSION
Donald W. Gladden, P.O. Box 1296, Eunice, N. Mex.
Filed Feb. 19, 1962, Ser. No. 174,121
1 Claim. (Cl. 280—96.2)

This invention relates to vehicles and more particularly to suspension of automobiles.

With modern automobiles travelling at modern speeds it is extremely important that the connection of the front wheels to the body of the automobile be secure. If any of the various elements fail, the results can be fatal; therefore, this invention is concerned with the safety of the automobile by improving the front end suspension.

On some automobiles the front wheel is suspended from the body by two parallel bars each of which is pivoted at one end to the body and on the other end to the spindle arm.

The point the spindle arm connects to these bars (one of which is called the A frame) is a point of great stress. This invention pertains to the strengthening of this point.

An object of this invention is to improve the suspension of automobiles.

Another object of this invention is to make automobiles safer.

A further object of this invention is to reinforce the point of connection upon the A frame to the spindle arm.

Still further objects are to achieve the above with a device that is sturdy, compact, durable, simple, and reliable, yet inexpensive and easy to manufacture and install.

The specific nature of the invention as well as other objects, uses, and advantages thereof will clearly appear from the following description and from the accompanying drawings, the different views of which are not necessarily to the same scale, in which:

FIG. 1 is a partial front view of the general arrangement of the front-end suspension of an automobile.

FIG. 2 is a sectional view showing the invention.

FIG. 3 is a sectional view similar to FIG. 2 showing a modification of the invention.

FIG. 4 is an exploded perspective view showing the A frame with the modified form of the invention.

As may be seen from the drawings this invention concerns that particular type of suspension wherein the spindle arm 10 is connected to the body 12 by a parallel motion linkage.

More specifically bar 14 is pivoted to the body 12 about an axis which is parallel to the longitudinal axis of the vehicle. Likewise, A frame 16 is pivoted to the body 12 about an axis which is parallel to the longitudinal axis of the vehicle. The spindle arm 10 is pivoted at its upper end 22 to the A frame 16 and its lower arm to the bar 14. The spindle arm 10 carries ground engaging wheel 18. Spring 20 extends from the body at a point which is not shown to bias the A frame down and the body 12 upward, i.e. the ground supports the wheel 18 which supports the spindle arm 10 which supports the A frame 16 which supports the body 12 through the action of the spring 20.

It will be understood that there are many parts and elements which have not been shown for the sake of simplicity, e.g. the two front wheels are connected together by level ride springs and there are various steering mechanisms and brake attachments, which are not shown inasmuch as they do not specifically apply to this invention.

The spindle arm 10 has a hole through the upper end 22 thereof. Bolt 24 extends through this hole in the end 22 of the arm 10. The bolt 24 has connected on one end thereof ball 26 which rests in a socket. The socket includes top half 28 which bears against the end of the A frame 16. It is attached by bolts 30 thereto. The socket also includes the bottom half 32 which holds the ball in place. The end of the spindle arm 22 rests against a shoulder of bolt 24. However, a nut 34 attaches to the end of the bolt 24 to hold the end 22 securely in place. Dust shield 35 covers the ball-socket joint.

The area where the top of the socket 28 bears against the A frame 16 causes trouble. This is a point of extremely high stress. After use of the vehicle on rough roads the A frame 16 tends to fail through fatigue at this point.

I have solved this problem by adding a reinforcing pad 36 to the bottom of the A frame 16. By this means the localized stress of the socket against the A frame 16 is spread over a wide area, reducing the strain, thereby preventing fatigue of metal and failure due to this cause.

As may be seen in FIGS. 3 and 4, one way this pad 36 may be made is to make it the exact contour of the A frame so that it fits onto the A frame 16 between the A frame and the top half of the socket 28. This provides the additional reinforcement at this point to prevent failure.

Another method of achieving the same results is to fabricate a different socket. In this case the top of the socket is an enlarged top 38 as may be seen in FIG. 2.

It will be apparent that the embodiments shown are only exemplary and that various modifications can be made in construction, materials, and arrangement within the scope of the invention as defined in the appended claim.

I claim as my invention:

In a system for front wheel suspension for a motor vehicle, the improvement comprising in combination: a vehicle body; a spindle arm attached to the vehicle body by a parallel motion linkage which includes a bar pivoted to the vehicle body about an axis which is parallel to the longitudinal axis of the vehicle, said bar also pivoted to the lower end of the spindle arm, and an A frame pivoted to the vehicle body about an axis which is parallel to the longitudinal axis of the vehicle; a spring extending from the A frame to the vehicle body for biasing the vehicle body upward relative to the A frame whereby the body is supported by a ground engaging wheel attached to the spindle arm through the linkage and spring; a bolt attached to the upper end of the spindle arm, said bolt having a ball on the end thereof, said ball extending upward and resting in a socket; a reinforcing pad attached between the A frame and the socket, the reinforcing pad having the exact contour of the A frame so that it fits onto the A frame, said reinforcing pad having an area of contact with the A frame far exceeding the area of contact of the socket to the reinforcing pad; whereby the highly concentrated stresses resulting from the pressure of the socket against the A frame is distributed over a large area of the A frame.

References Cited in the file of this patent

UNITED STATES PATENTS

| | | |
|---|---|---|
| 2,325,894 | Wahlberg et al. | Aug. 3, 1943 |
| 2,928,687 | Latzen | Mar. 15, 1960 |
| 3,039,788 | Farago | June 19, 1962 |